Jan. 13, 1931.                    E. VELTEN                    1,788,645
          PROCESS FOR MAKING PHOTOGRAPHS AND CAMERA DEVICE
                  SUITABLE FOR EMPLOYMENT THEREWITH
                    Filed March 1, 1928      5 Sheets-Sheet 2

Fig. 2.

INVENTOR
Edwin Velten
BY
ATTORNEY

Jan. 13, 1931.  E. VELTEN  1,788,645
PROCESS FOR MAKING PHOTOGRAPHS AND CAMERA DEVICE
SUITABLE FOR EMPLOYMENT THEREWITH
Filed March 1, 1928   5 Sheets-Sheet 3

INVENTOR
Edwin Velten
BY
Horace Lehman
ATTORNEY

Jan. 13, 1931. E. VELTEN 1,788,645
PROCESS FOR MAKING PHOTOGRAPHS, AND CAMERA DEVICE
SUITABLE FOR EMPLOYMENT THEREWITH
Filed March 1, 1928 5 Sheets-Sheet 4
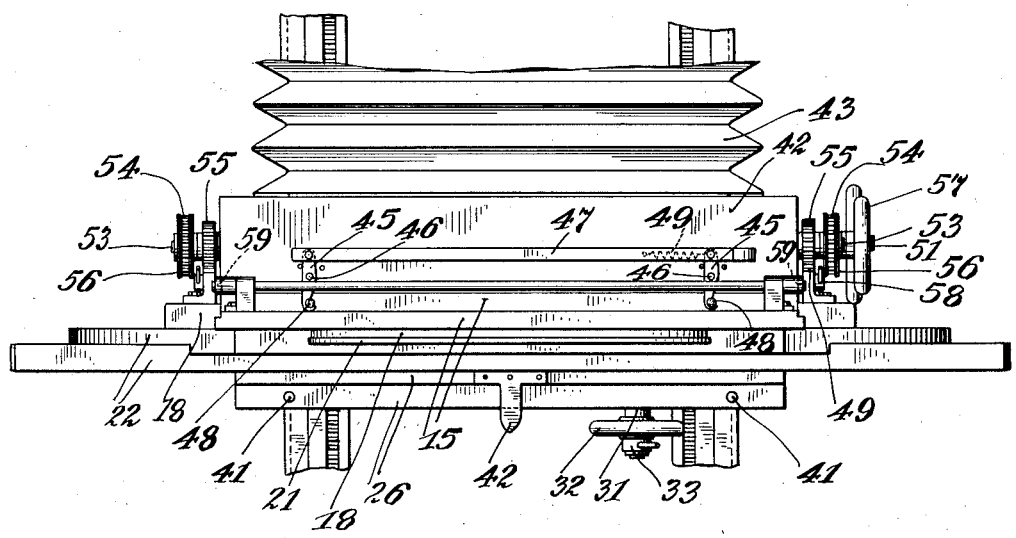
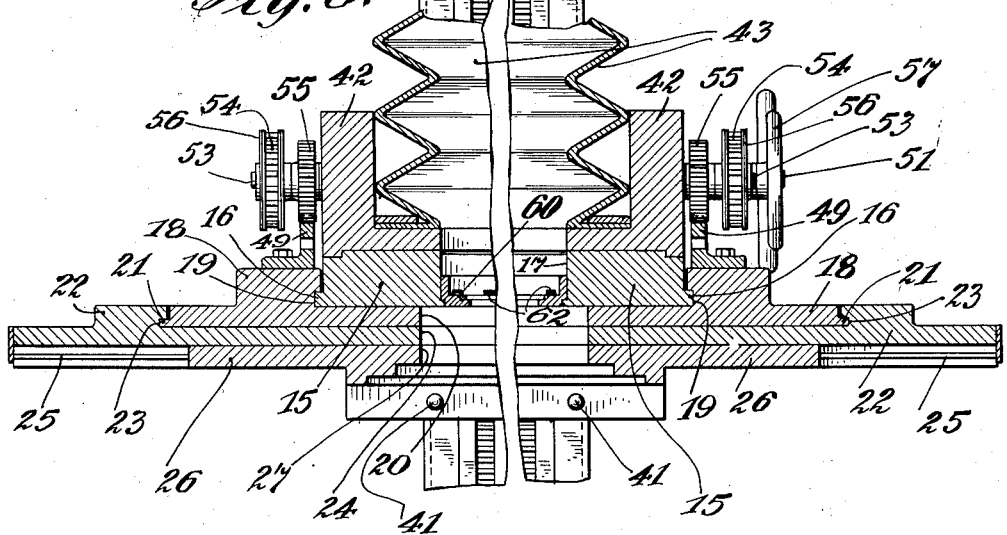
INVENTOR Jan. 13, 1931.  E. VELTEN  1,788,645
PROCESS FOR MAKING PHOTOGRAPHS AND CAMERA DEVICE
SUITABLE FOR EMPLOYMENT THEREWITH
Filed March 1, 1928   5 Sheets-Sheet 5
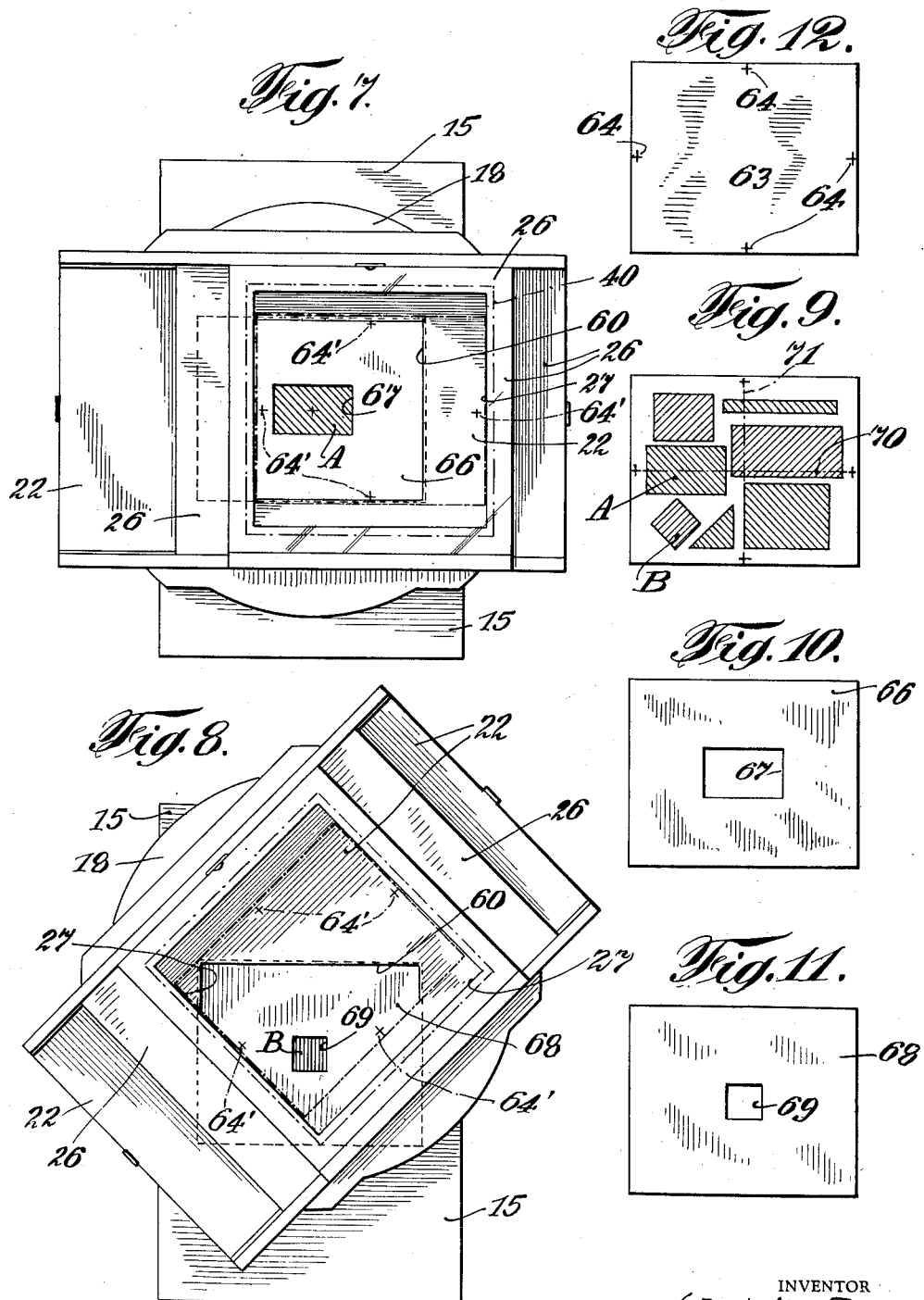

Patented Jan. 13, 1931

1,788,645

UNITED STATES PATENT OFFICE

EDWIN VELTEN, OF ELMHURST, NEW YORK, N. Y.

PROCESS FOR MAKING PHOTOGRAPHS AND CAMERA DEVICE SUITABLE FOR EMPLOYMENT THEREWITH

Application filed March 1, 1928. Serial No. 258,254.

My invention relates to processes for making photographs and camera devices suitable for employment therewith, and refers particularly to processes and camera devices adaptable for the photographing of a plurality of designs upon a single plate in predetermined positions with respect to each other.

While my process and camera device are particularly suitable for the production of lay-out prints for books, magazines and other similar printed publications, they have other uses as will be evident and, hence, I do not limit myself to that particular application, but will refer to it in my specification, simply as a means for describing my camera devices and their employment.

It is frequently necessary to print a number of different pictures, or designs, upon a single sheet, or page. This is accomplished by making a separate negative of each design. A positive is made from each of these negatives and a negative print is then made from each of these positives. It is now necessary to arrange these positives in exactly the same position with respect to each other as they have upon the lay-out. This requires great accuracy and as it cannot be accomplished by mechanical means its success or failure is dependent upon the skill of the operator.

If there are five designs upon the lay-out, five negatives, five positives and five negative prints must be made and if it is a design for color print, four times each of these must be produced and aligned accurately with each other.

It will thus be seen that a great number of operations and exceptional skill is necessary, resulting in the expenditure of much time and labor.

My invention overcomes the above-mentioned objectionable and expensive features and presents a means whereby all of the designs upon a lay-out are photographed upon a single plate in their exact desired position with respect to each other, thus greatly reducing the time and expense incident to the make-up of the lay-out prints and to the consumption of plates and paper, while producing results of much greater accuracy and faithfulness of reproduction.

A consideration of my specification and accompanying drawings will illustrate the many advantages of my invention and its great convenience and artistic advance of the processes and devices now employed in the art.

In the accompanying drawings illustrating one form of the device of my invention, similar parts are designated by similar numerals.

Figure 2 is a rear view of the device of Figure 1.

Figure 4 is a top view of the device of Figure 1.

Figure 6 is a section on the line 6—6 of Figure 1.

Figure 7 is a front view showing the positions of the several parts in photographing design A of the lay-out shown in Figure 9.

Figure 8 is a front view showing the positions of the several parts in photographing design B of the lay-out shown in Figure 9.

Figure 9 is a view of a lay-out.

Figure 10 is a mask used in photographing design A of Figure 9.

Figure 11 is a mask used in photographing design B of Figure 9.

Figure 12 is a mask containing slots representing the lay-out markings.

Figure 1:
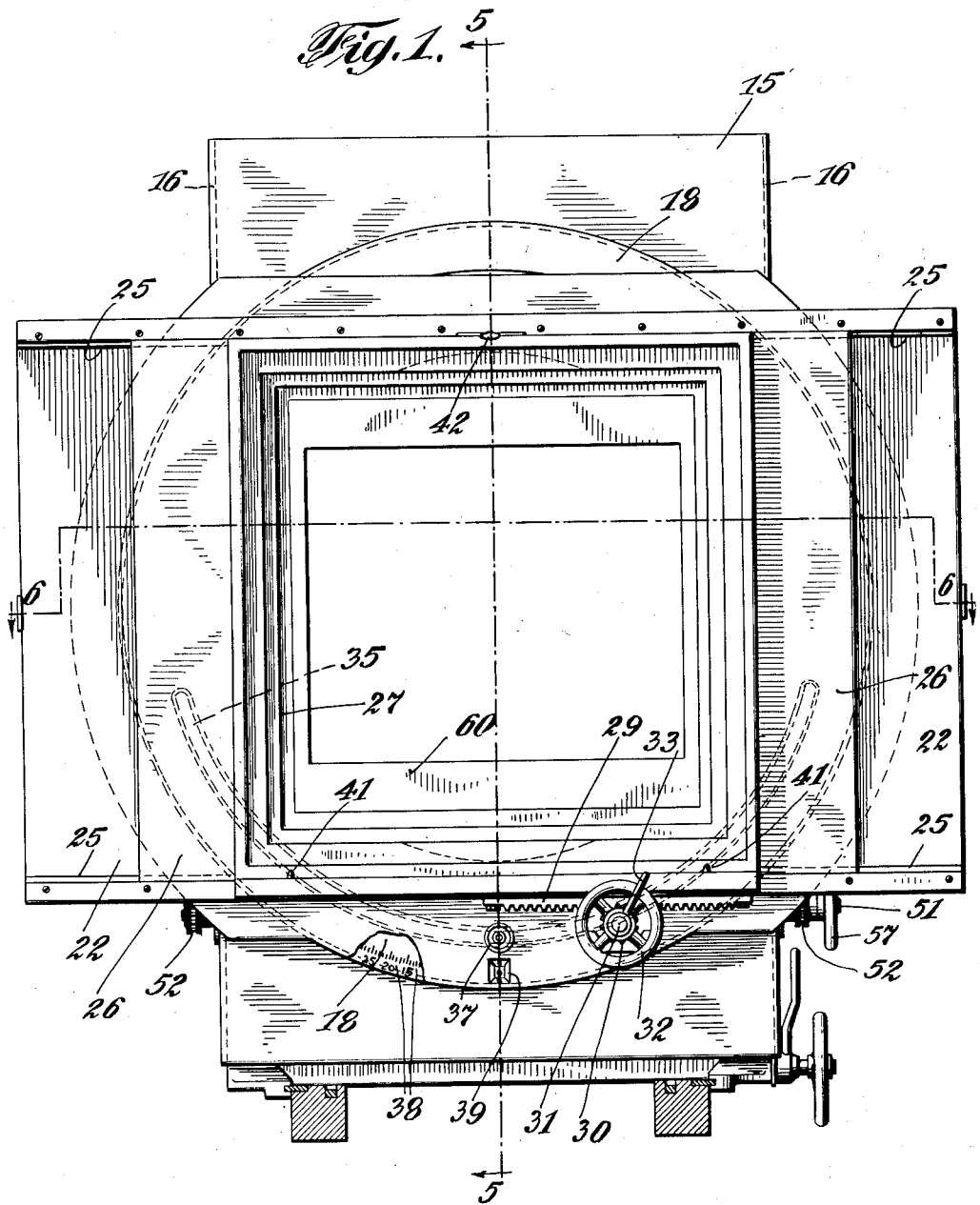
Figure 1 is a front view of one form of my device partly broken away for purposes of explanation.
Figure 3:
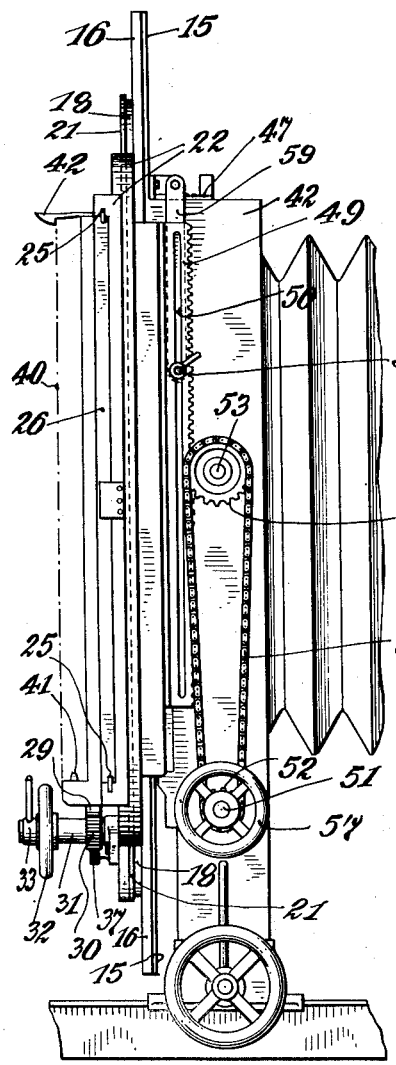
Figure 3 is a side view of the device of Figure 1.
Figure 5:
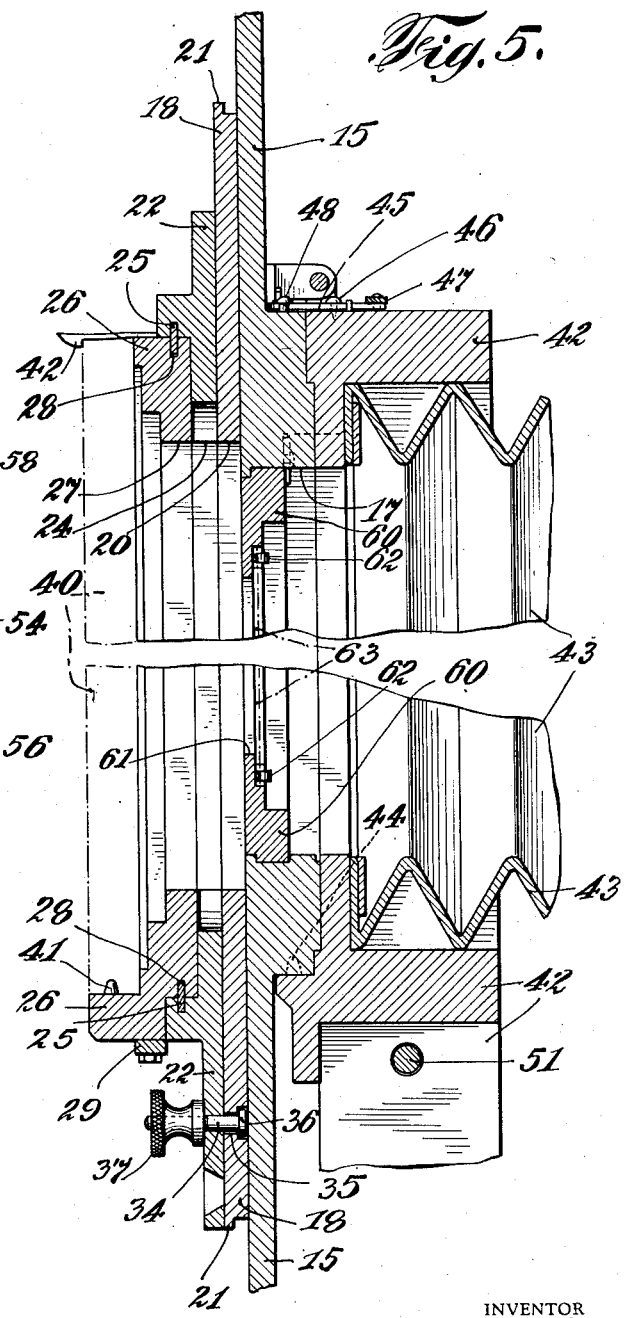
Figure 5 is a section on the line 5—5 of Figure 1.

The particular form of the device of my invention shown in the accompanying drawings comprises a base member 15, the two vertical sides of which have the extended tongues 16, 16. The base 15 has a centrally positioned rectangular opening 17, the center of which is in the optical axis of the lens of the camera to which my device is affixed.

Abutting upon the outer face of the base 15 is an annular vertically slidable member 18, having a recess 19 within each side thereof into which the tongues 16, 16, of the base member are fitted, thus acting as a guide for the vertical movement of the slidable member 18. The vertical slide 18 has a centrally positioned rectangular opening 20. The member 18 has a peripheral tongue 21.

Abutting upon the outer face of the annular vertically slidable member 18 is a rotatable member 22, having an annular recess 23, into which the tongue 21 of the member 18 is fitted, thus acting as a guide for the rotational movement of the member 22. The rotatable member 22 has a centrally positioned rectangular opening 24. The member 22 carries the fixedly attached longitudinally positioned extended tongues 25, 25.

Abutting upon the outer face of the rotatable member 22 is a horizontally slidable member 26, having a centrally positioned rectangular opening 27. The member 26 has a recess 28 in its upper and lower portions into which the tongues 25, 25 are fitted thus acting as a guide for the horizontal movement of the member 26.

It will thus be seen that if the base 15 is fixedly positioned, the member 18 carrying the member 22 and 26 can be moved vertically, that the member 22 carrying the member 26 can be rotated and that the member 26 can be moved horizontally with respect to its original position.

As a means for imparting a horizontal movement to the member 26, a rack 29 attached to the member 26 meshes with the pinion 30 fixedly attached to the revoluble shaft 31 carrying the fixedly attached operating wheel 32 and the locking member 33.

As a means for imparting a rotational movement to the member 22, a pin member 34 passes through an opening in the member 22 and is movable within the segment-shaped slot 35 of the member 18. The pin 34 has an internal head 36, and an outer nut 37 threaded upon said pin. The revolution of the nut 37, therefore, will release the head 36 from abutment against its recess in the member 18, allowing the revolution of the member 22 and can be employed as a means for locking the member 22 from rotation. The lower outer face of the slidable member 18 carries degree markings 38, visible through the window 39 of the member 22 in order that the degree of rotation may be observed and noted.

A photographic plate carrier 40 is positioned within the device by fitting the pins 41, 41 of the member 26 into corresponding holes in the bottom of the plate carrier and maintaining the upper portion in position by means of the spring-catch 42.

A means for attaching my device to the rear portion of a camera is as follows:—

The rear camera frame 42, carrying the bellows 43, has a plurality of pins 44, 44, fitting into corresponding holes within the lower portion of the base member 15. The upper face of the camera frame carries a plurality of hook-catches 45, 45 pivotal at 46, 46 and connected by the bar 47, the hooks of which are capable of placement around the pins 48, 48 of the member 15. A spring 49 tends to maintain the hooks 45, 45 in locking position with the pins 48, 48.

A means for moving the associated members vertically across the face of the base member 15 is as follows:—

The rearward face of each side of the member 18 carries a rack 49, having a longitudinal slot 50 therein. A revoluble shaft 51 passes transversely of the camera and carries a sprocket 52 upon each extremity thereof. Each side of the camera frame 42, carries a revoluble shaft 53 each carrying the fixedly attached sprocket 54 and pinion 55, the former of which is connected to the sprocket 52 by means of the link belt 56, and the latter of which meshes with the rack 49. By revolving the wheel 57, which is fixedly attached to the shaft 51, the movable portions of my device may be given a vertical movement. The device may be fixed in any vertical position by means of the locking member 58 passing through the slot 50 and carried by the fixed member 59 fixedly attached to the member 15.

Positioned within the base 15 is a diaphragm 60, having a centrally positioned opening 61, the center of which is in the axial line of the optical center of the lens within the camera.

Across the face of the diaphragm and attached thereto by means of the pivotal hooks 62, 62, is a removable mask 63 of opaque material, having the registering slots 64, 64 therein.

I have indicated my device as attached to the rear frame of an ordinary vibrating camera, but its use is not limited to such a camera.

In order to explain the operation of my device I will consider its employment in the photographing of the designs A and B of the lay-out shown in Figure 9.

I place a ground glass, upon which has been pasted a transparent sheet carrying the outlines of the lay-out within the plate-holder, said lay-out also having marked thereon centrally positioned horizontal and vertical lines 70 and 71. This is then placed in the camera and mask 63 introduced. My device is moved until the registering slots 64, 64 of the mask exactly coincide with the horizontal and vertical lines on the ground glass. The ground glass is then removed and a photographic plate introduced and a photograph made, which results in the photographing of the registering slots 64, 64. The photographic plate is then removed in order to photograph design A. I introduce the mask 66 of Figure 10 into the camera, the outline of the opening 67 being of the desired size with respect to the design A. The center of the opening 67 will therefore be in the axis of the optical center of the lens. I then place the ground glass within the plate-holder, and move the several members of my device until the outline of design A upon the ground glass exactly coincides with the opening 67 of the mask as shown in Figure 7, I then remove the ground glass and replace it by a photographic plate and make an exposure. I have now made an exposure of design A upon the plate in exactly the position it has on the lay-out. I now remove the plate-holder and place the ground glass lay-out in my device. I then remove the mask 66 and substitute mask 68 having an opening 69 corresponding to design B.

The members of my device are now moved until the outline B of the ground glass lay-out exactly coincides with the opening 69 of the mask 68 as shown in Figure 8. The ground glass is then removed, the plate-holder placed in position and the photographic image made thereon.

It will thus be seen that the photographic impressions of designs A and B are in exactly the same position with respect to each other as they are upon the lay-out of Figure 9.

Similar operations are performed with the other designs of Figure 9, thus producing a plate having photographic images of the designs in exactly the same position with respect to each other as shown in Figure 9, with the photographic lay-out markings 64', 64', in the exact centers of the respective sides.

If the above described plate has been taken through a red filter, it is evident that a similar procedure taken upon two other plates through yellow and blue filters will result in the production of three photographic plates of the entire lay-out, each having coinciding lay-out indications allowing of perfect registration.

A consideration of the above indicates the advantages of my device in the production of photographic lay-outs compared with the present employed methods.

In order to produce a three color print of the lay-out of Figure 9 by the ordinary methods, it would be necessary to take 21 negatives, make 21 positives and then make 21 negative tissue carbon prints. It would then be necessary to arrange each of these 21 tissue carbons with the greatest accuracy in the exact arrangement of the lay-out.

By my process, however, I take but 3 negatives, make 3 positives and then make 3 negative tissue carbon prints. Further, as my negatives carry the photographic prints of the exact lay-out, it is not necessary for me to arrange them for purposes of color printing.

Further, as each of my negatives carries a lay-out marking corresponding to the lay-out markings upon the other negatives, I can register the prints accurately by simply bringing the lay-out markings into coincidence.

A further advantage of my process rests in the ability to develop the plate and print and develop all of the several designs of the lay-out at one time because they are all carried by one photographic plate. This uniformity of design prints cannot be accomplished by the present employed methods, which, in the case of Figure 9, would require the development of 7 different plates and the printing of 7 different negatives, thus presenting the undesirable possibility of 7 prints of relatively different density and clearness from those of the original designs.

The above-mentioned and other highly valuable properties of my new process of printing and my new camera will be evident upon a consideration of my specification and accompanying drawings.

I do not limit myself to the particular size, shape, number, arrangement of parts or steps of process as shown and described as these are given simply as a means for clearly describing my invention.

What I claim is:—

In a camera device for taking a plurality of photographs upon a single plate, said photographs being in predetermined positions with respect to each other, in combination, a stationary base, a plate-holder, means moving the plate-holder horizontally with respect to the base, means moving the plate-holder vertically with respect to the base and means moving the plate-holder rotatably with respect to the base.

Signed at Long Island City in the county of Queens and State of New York this 28th day of February, 1928.

EDWIN VELTEN.